(12) United States Patent
Lin

(10) Patent No.: US 10,939,095 B2
(45) Date of Patent: Mar. 2, 2021

(54) DISPLAY SYSTEM FOR CALIBRATING A DISPLAYED IMAGE BY USING A CALIBRATION DEVICE

(71) Applicant: BENQ CORPORATION, Taipei (TW)

(72) Inventor: Hsin-Nan Lin, Taipei (TW)

(73) Assignee: BENQ CORPORATION, Taipei (TW)

( * ) Notice: Subject to any disclaimer, the term of this patent is extended or adjusted under 35 U.S.C. 154(b) by 32 days.

(21) Appl. No.: 16/402,255

(22) Filed: May 3, 2019

(65) Prior Publication Data

US 2019/0260985 A1  Aug. 22, 2019

Related U.S. Application Data

(62) Division of application No. 15/863,985, filed on Jan. 8, 2018.

(30) Foreign Application Priority Data

Feb. 15, 2017 (CN) .......................... 201710081056.8

(51) Int. Cl.
  *H04N 17/00* (2006.01)
  *G09G 3/20* (2006.01)
  *G09G 3/00* (2006.01)
  *G09G 5/00* (2006.01)
(52) U.S. Cl.
  CPC .......... *H04N 17/004* (2013.01); *G09G 3/006* (2013.01); *G09G 3/2003* (2013.01); *G09G 5/006* (2013.01); *G09G 2320/0693* (2013.01); *G09G 2360/145* (2013.01); *G09G 2370/04* (2013.01); *G09G 2370/10* (2013.01); *G09G 2370/16* (2013.01); *G09G 2370/18* (2013.01)

(58) Field of Classification Search
  CPC .... H04N 17/004; G09G 3/006; G09G 3/2003; G09G 5/006; G09G 2320/0693; G09G 2360/145; G09G 2370/04; G09G 2370/10; G09G 2370/16; G09G 2370/18
  See application file for complete search history.

(56) References Cited

U.S. PATENT DOCUMENTS

| 7,277,104 | B2 | 10/2007 | Dickens |
| 2004/0036708 | A1 | 2/2004 | Evanicky |
| 2007/0195209 | A1 | 8/2007 | Cheng |
| 2007/0216772 | A1 | 9/2007 | Xu |
| 2012/0218320 | A1 | 8/2012 | Evanicky |
| 2015/0347336 | A1 | 12/2015 | Uekuri |
| 2019/0251929 | A1* | 8/2019 | Fossati ................. G01J 3/463 |

FOREIGN PATENT DOCUMENTS

| CN | 105869561 A | 8/2016 |
| TW | 200939185 | 9/2009 |

* cited by examiner

Primary Examiner — Michael E Teitelbaum
(74) Attorney, Agent, or Firm — Winston Hsu

(57) ABSTRACT

A display system for calibrating a displayed image includes a monitor device and a calibration device. The monitor device is used for displaying a calibration interface when an image calibration process is performed. The calibration device is coupled to the monitor device for selecting a calibration mode through the calibration interface. The calibration interface includes at least one calibration mode. The calibration device selects and confirms the calibration mode from the at least one calibration mode by using at least one key.

7 Claims, 3 Drawing Sheets

DISPLAY SYSTEM FOR CALIBRATING A DISPLAYED IMAGE BY USING A CALIBRATION DEVICE

CROSS REFERENCE TO RELATED APPLICATIONS

This is a divisional application of U.S. application Ser. No. 15/863,985 (filed on Jan. 8, 2018). The entire contents of the related applications are incorporated herein by reference.

BACKGROUND OF THE INVENTION

1. Field of the Invention

The present invention illustrates a display system, and more particularly, a display system for calibrating a displayed image by using a calibration device.

2. Description of the Prior Art

With rapid development of science and technologies, various displays have been widely used by users, such as backlight displays, direct-type displays or edge-lit displays. Further, since high density of a pixel array is popularly applied to the display, the display is capable of displaying high resolution images. When images are displayed on different displays, since production processes and user configurations are varied for different displays, some color deviation effects of displayed images indifferent displays may occur. For example, a color shift effect, a white balance offset effect, and a hue shift effect may occur. These color deviation effects often cause the display to display images with unpleasant colors or distorted colors.

When some color deviation effects occur, a usual solution is to turn on an "on screen display (OSD)" function of the display for manually adjusting appropriate parameters of the display. The user gradually adjusts image colors by trailing an error process. However, the method for manually correcting the displayed image is time-consuming and imprecise. Recently, some advanced displays have an automatic image calibration function. For example, the display can provide some automatic calibration options in OSD. Also, the display has an automatic calibration button. The user can enable the automatic calibration function for correcting color of the displayed image. Although some advanced displays have the automatic calibration function, the automatic calibration function is only regarded as a function of color calibration. In other words, the automatic calibration function cannot deal with advanced image control. Further, conventional displays with the color calibration function cannot synchronize or communicate with external data. Therefore, they cannot use an external database for updating or enhancing color calibration capability. Since the color calibration function of the conventional display is performed according to its own database, it cannot guarantee that the displayed image is optimized after the color calibration function is performed.

SUMMARY OF THE INVENTION

In an embodiment of the present invention, a display system for calibrating a displayed image is disclosed. The display system comprises a monitor device and a calibration device. The monitor device is configured to display a calibration interface when an image calibration process is performed. The calibration device is coupled to the monitor device and configured to select a calibration mode through the calibration interface. The calibration interface comprises at least one calibration mode. The calibration device selects and confirms the calibration mode from the at least one calibration mode by using at least one key.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
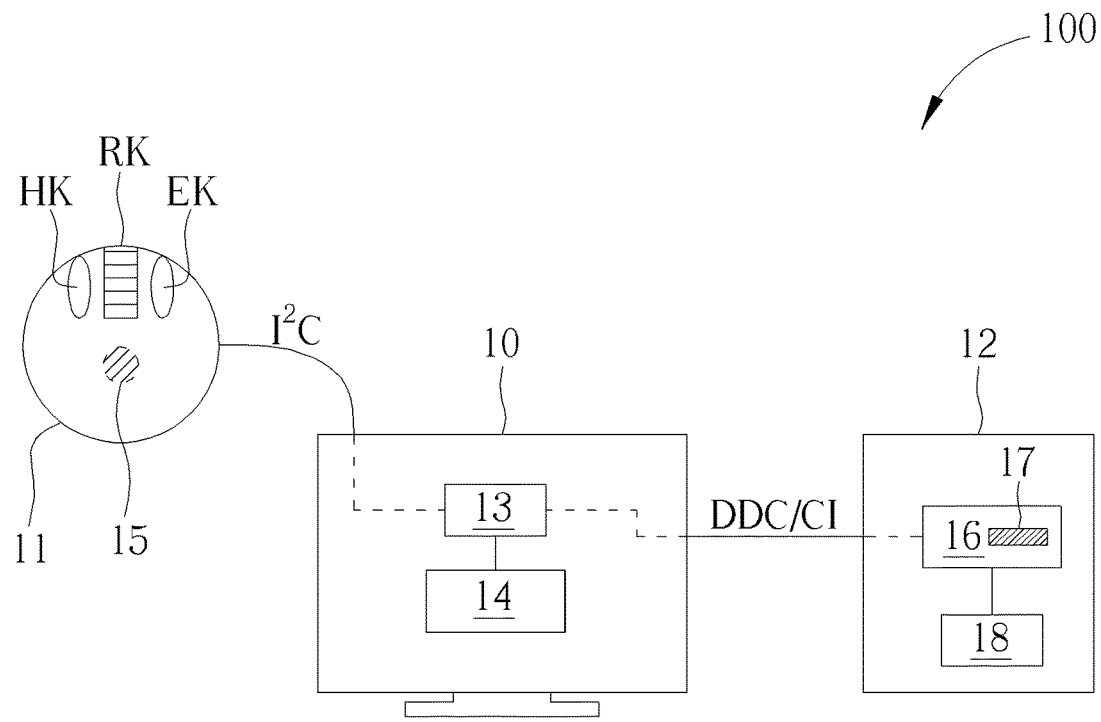
FIG. 1 is a structure of a display system according to an embodiment of the present invention.

FIG. 1 is a structure of a display system 100 according to an embodiment of the present invention. The display system 100 includes a monitor device 10, a calibration device 11, and a computer device 12. The monitor device 10 can be any screen capable of establishing a connection link. The monitor device 10 can be a liquid crystal display, a backlight display, a direct-type display, or an edge-lit display. The monitor device 10 is capable of displaying an image. Therefore, the monitor device 10 can generate an optical signal corresponding to the displayed image. The monitor device 10 is also capable of receiving an optical characteristic signal. The optical characteristic signal is illustrated later. The calibration device 11 is coupled to the monitor device 10 and includes a sensor 15 for sensing the optical signal. The calibration device 11 can generate an optical characteristic signal according to the optical signal. The calibration device 11 can be any portable device, such as a mouse shaped portable device, or a semicircular sphere shaped portable device. The calibration device 11 can communicate with the monitor device 10 by using a wired or a wireless link. The sensor 15 of the calibration device 11 can be an optical sensor capable of sensing the optical signal. Further, the sensor 15 can convert an analog optical signal into a digit optical characteristic signal. For example, the sensor 15 can convert the analog optical signal into the digit optical signal by using an internal color filter (i.e., an RGB Filter). Here, the digit optical signal can be regarded as an optical characteristic signal. The optical characteristic signal can include three-dimensional color parameters of the image currently displayed on the monitor device 10, such as gray scale parameters and RGB gain parameters. The computer device 12 can be any device capable of performing programmable functions, such as a personal computer, a notebook, a tablet, a smart phone, or a work station. The computer device 12 can be coupled to the monitor device 10 for receiving the optical characteristic signal. Further, the computer device 12 can generate a color calibration signal to the monitor device 10 for calibrating the displayed image of the monitor device 10. The color calibration signal generated by the computer device 12 can include color gamut conversion data, gamma curve table data, and RGB gain calibration data. In the embodiment, the monitor device 10 can calibrate the displayed image according to the color calibration signal generated by the computer device 12. However, the present invention is not limited to generating the color calibration signal by the computer device 12. For example, in other embodiments, the monitor device 10 can individually generate the color calibration signal according to the optical characteristic signal output from the calibration device 11. Then, the monitor device 10 can calibrate the displayed image automatically by using the color calibration signal. In other words, when the monitor 10 has high computational capability, the color calibration signal can be self-generated for calibrating the displayed image without requiring any computer assistance. Therefore, the display system 100 can omit the computer device 12 when the monitor device 10 has high computational capability. A circuit structure of the display system 100 is illustrated below.

As shown in FIG. 1, the monitor device 10 can include a chip processor (i.e., a scalar) 13 and a first memory 14. The first memory 14 can be an electrically-erasable programmable read-only memory (EEPROM) or any device capable of saving data. The calibration device 11 can include at least one key in conjunction with the sensor 15 previously mentioned. The at least one key can be regarded as at least one functional key. In the embodiment, the at least one key can include a hotkey HK, a rolling key RK, and an enter key EK. In the embodiment, all keys can be disposed on a side of the calibration device 11. The sensor 15 can be disposed on another side of the calibration device 11, so as to facilitate user operation. The calibration device 11 can receive the color calibration signal by using the hotkey HK in order to trigger the monitor device 10 for calibrating the displayed image of the monitor device 10. The sensor 15 of the calibration device 11 can be linked to the chip processor 13 of the monitor device 10. As previously mentioned, the linking state can be a wired connection or a wireless connection. For example, the sensor 15 of the calibration device 11 can be coupled to the chip processor 13 of the monitor device 10 through an inter-integrated circuit ($I^2C$) bus. The chip processor 13 is used for receiving the optical characteristic signal transmitted from the calibration device 11. The computer device 12 can include a graphic processor 16, an identification unit 17, and a software program 18. The identification unit 17 can receive and identify the optical characteristic signal. The software program 18 controls the graphic processor 16 according to an identification result of the identification unit 17 for generating a color calibration signal to the monitor device 10. In the embodiment, the identification unit 17 is coupled to the chip processor 13 of the monitor device 10. The chip processor 13 transmits the received optical characteristic signal to the identification unit 17. In practice, the computer device 12 may further include at least one resistor. The at least one resistor is coupled to the identification unit 17 and can be used for adjusting a voltage of the optical characteristic signal. Specifically, the computer device 12 can include a second memory. The software program 18 of the computer device 12 can be installed in the second memory of the computer device 12. For example, the software program 18 can be installed in a memory space of a hard disk of the computer device 12. Further, the graphic processor 16 and the identification unit 17 may be two separated devices. However, the graphic processor 16 can be designed to integrate the identification unit 17 as a multi-functional graphic processor (i.e., as shown in the embodiment). Any reasonable hardware modification falls into the scope of the present invention. The graphic processor 16 of the computer device 12 is coupled to the chip processor 13 of the monitor device 10. The coupling hardware can be implemented by using a connection bus with a standard of display data channel command interface (DDC/CI) protocol. However, the coupling hardware can be implemented by using the inter-integrated circuit ($I^2C$) bus.

Figure 2:
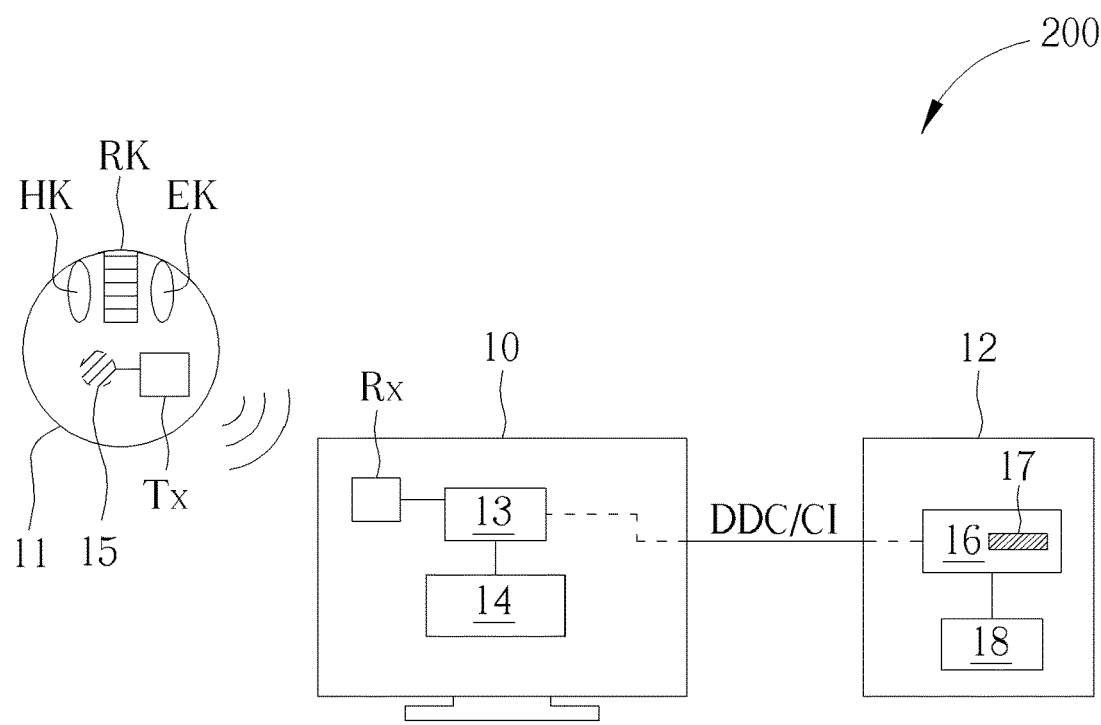
FIG. 2 is a structure of a display system according to another embodiment of the present invention.

As previously mentioned, the calibration device 11 can be any movable device and coupled to the monitor device 10 by using a wired link or a wireless link. FIG. 2 is a structure of a display system 200 according to another embodiment of the present invention. A hardware structure of the display system 200 is similar to the hardware structure of the display system 100. A difference is that the calibration device 11 of the display system 200 includes a transmitter Tx coupled to the sensor 15. The monitor device 10 includes a receiver Rx coupled to the chip processor 13. The transmitter Tx is capable of broadcasting a radio-frequency electromagnetic signal. The receiver Rx is capable of receiving the radio-frequency electromagnetic signal. In the display system 200, the transmitter Tx of the calibration device 11 and the receiver Rx of the monitor device 10 can communicate data by using any wireless transmission protocol, such as Bluetooth or Wi-Fi protocol. After the sensor 15 senses the optical signal and generates the optical characteristic signal, the optical characteristic signal can be converted into packet data. Then, the packet data can be broadcasted by using the transmitter Tx as the radio-frequency electromagnetic signal. After the radio-frequency electromagnetic signal including the packet data is received by the receiver Rx, information of the packet data can be extracted from the optical characteristic signal by using the chip processor 13. In other words, data communication between the calibrating device 11 and the monitor device 10 can be achieved by using a wireless link or a wired link (i.e., $I^2C$ bus) as described. Any reasonable communication method between two devices falls into the scope of the present invention.

Figure 3:
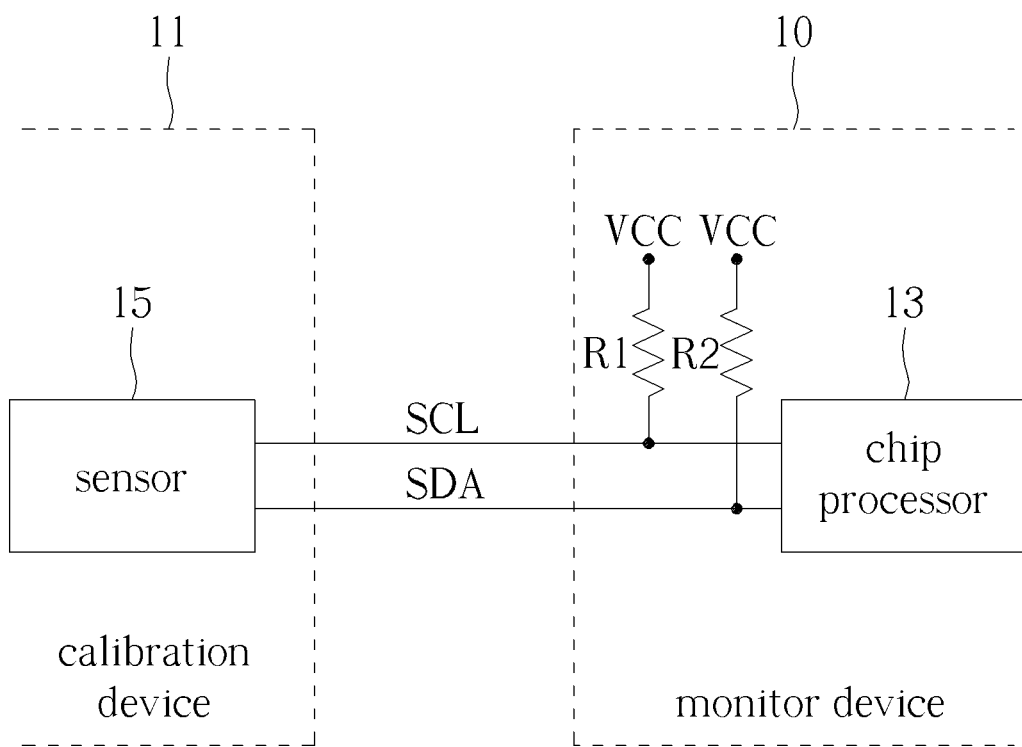
FIG. 3 is a circuit structure between a sensor and a chip processor of the display system in FIG. 1.

FIG. 3 is a circuit structure between the sensor 15 and the chip processor 13 of the display system 100. As previously mentioned, the sensor 15 can generate the optical characteristic signal according to the optical signal. The optical characteristic signal can be transmitted from the sensor 15 to the chip processor 13 through the $I^2C$ bus. The $I^2C$ bus can include a first resistor R1 and a second resistor R2. In other words, the optical characteristic signal includes a serial data line signal SDA and a serial clock line signal SCL. A transmission line for the serial clock line signal SCL is coupled to the first resistor R1. The first resistor R1 is also coupled to a terminal of a high voltage VCC.

Since the sensor 15 and the chip processor 13 have internal impedances, the first resistor R1 is used for adjusting a voltage of the serial clock line signal SCL. A transmission line for the serial data line signal SDA is coupled to the second resistor R2. The second resistor R2 is also coupled to the terminal of the high voltage VCC. Similarly, the second resistor R2 is used for adjusting a voltage of the serial data line signal SDA. As shown in FIG. 3, since the first resistor R1 and the second resistor R2 can change the voltages of the serial clock line signal SCL and the serial data line signal SDA, the first resistor R1 and the second resistor R2 can be appropriately designed according to specific requirements in order to control the voltages of the serial line clock signal SCL and the serial data line signal SDA processed by the processing chip 13. However, the present invention is not limited to FIG. 3. For example, the first resistor R1 can be replaced with a plurality of resistors connected in series. The second resistor R2 can also be replaced with a plurality of resistors connected in series. Any reasonable hardware modification falls into the scope of the present invention.

Figure 4:
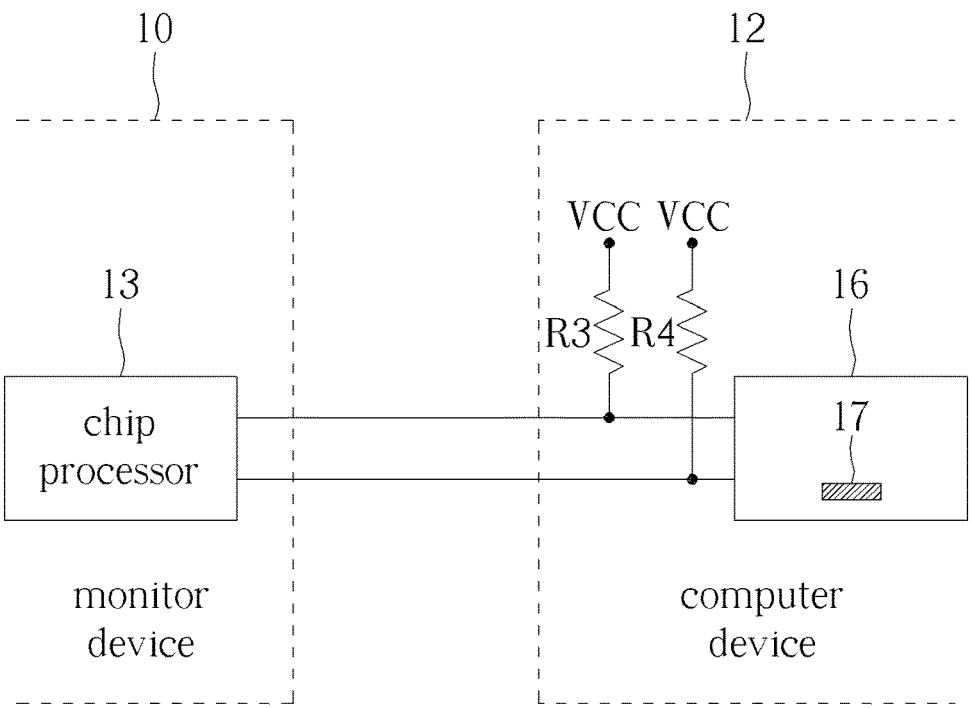
FIG. 4 is a circuit structure between a chip processor and a graphic processor of the display system in FIG. 1.

FIG. 4 is a circuit structure between the chip processor 13 and the graphic processor 16 of the display system 100. As previously mentioned, after the chip processor 13 receives the optical characteristic signal generated by the sensor 15, the optical characteristic signal can be further transmitted to the computer device 12 for advanced signal processing. In the embodiment, the chip processor 13 and the graphic processor 16 can be coupled through the DDC/CI or the I²C bus. Therefore, similar to the previous structure, a third resistor R3 and a fourth resistor R4 can be respectively coupled to different transmission lines for outputting signals from the chip processor 13. In other words, the computer device 12 can use at least one resistor (i.e., the third resistor R3 and the fourth resistor R4) for adjusting a voltage of the optical characteristic signal. Similarly, the third resistor R3 can be replaced with a plurality of resistors connected in series. The fourth resistor R4 can also be replaced with a plurality of resistors connected in series. Any reasonable hardware modification falls into the scope of the present invention. Moreover, as previously mentioned, the graphic processor 16 and the identification unit 17 can be two separated devices. The graphic processor 16 can be designed to integrate the identification unit 17 as a multi-functional graphic processor (i.e., as shown in the embodiment). Thus, in FIG. 4, although the graphic processor 16 is coupled to the chip processor 13, the identification unit 17 can be regarded as being coupled to the chip processor 13 since it is integrated to the graphic processor 16. After the chip processor 13 transmits the optical characteristic signal to the computer device 12, the identification unit 17 can receive and identify the optical characteristic signal. For example, the identification unit 17 can identify color information and brightness information from the optical characteristic signal. Further, since the software program 18 is installed in the computer device 12, the software program 18 can control the graphic processor 16 to generate a color calibration signal to the monitor device 10 according to an identification result of the identification unit 17.

Figure 5:
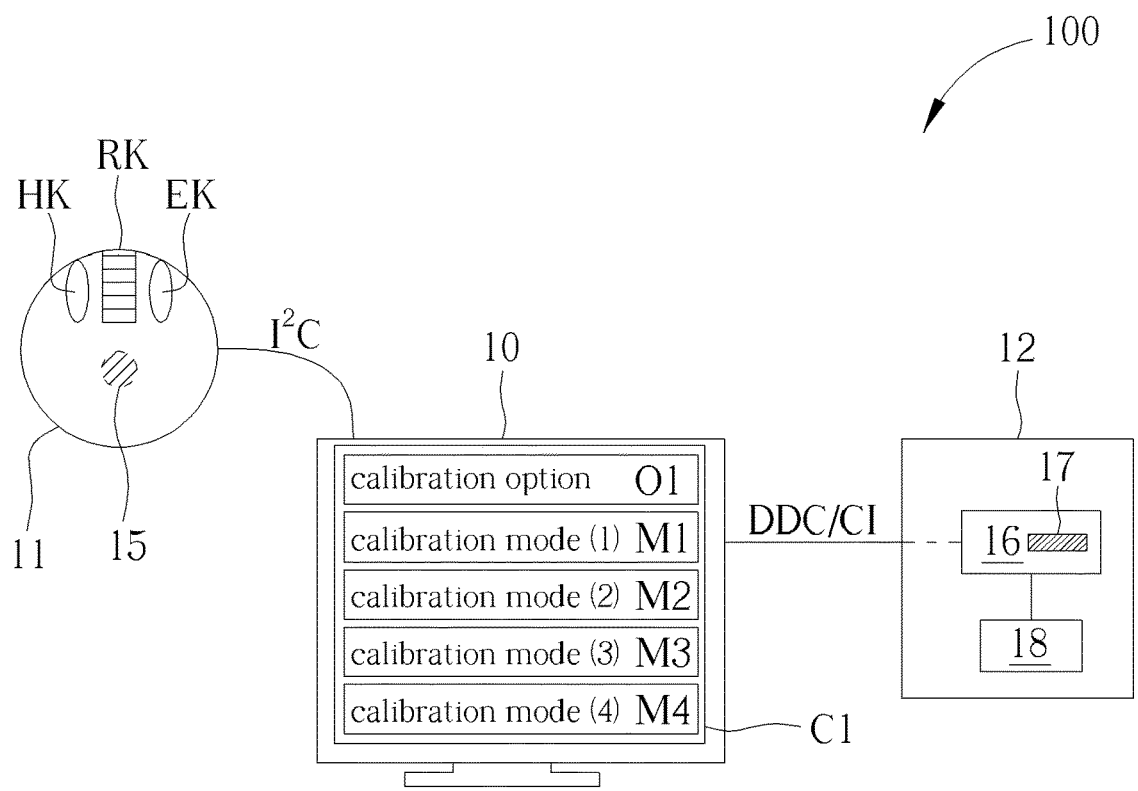
FIG. 5 is an illustration of a calibration interface including a plurality of calibration modes displayed on the monitor device of the display system in FIG. 1.

FIG. 5 is an illustration of a calibration interface C1 including a plurality of calibration modes displayed on the monitor device 10 of the display system 100. In the embodiment, FIG. 5 is used for illustrating a method for calibrating a displayed image in the display system 100. Initially, the monitor device 10 displays an image and generates an optical signal. When a user wants to start an image calibration process, a hotkey HK of the calibration device 11 can be clicked. After the hotkey HK of the calibration device 11 is clicked, the monitor device 10 and the computer device 12 can be triggered to perform the image calibration process. At the moment, an on screen display (OSD) function of the monitor device 10 can be used for generating and displaying the calibration interface C1. However, the generation method of the calibration interface C1 of the present invention is not limited to the use of the monitor device 10. For example, after the hotkey HK of the calibration device 11 is clicked, the chip processor 13 of the monitor device 10 can transmit a third data signal to the identification unit 17 of the computer device 12. Then, the identification unit 17 controls the computer device 12 to transmit the calibration interface C1 to the monitor device 10 according to the third data signal. Since the monitor device 10 can be linked to the computer device 12, the calibration interface C1 can be generated by using the computer device 12 instead of generating by using the monitor device 10. The calibration interface C1 includes a calibration option window O1 and at least one calibration mode. For example, the calibration interface C1 includes a first calibration mode corresponding to a window M1, a second calibration mode corresponding to a window M2, a third calibration mode corresponding to a window M3, and a fourth calibration mode corresponding to a window M4. However, the present invention is not limited to the number of calibration modes. Then, the user can select a calibration mode to be executed (for example, the first calibration mode or the second calibration mode) from the at least one calibration mode by using the rolling key RK (i.e., or say, the mouse wheel) of the calibration device 11 and confirm the selected calibration mode by using the enter key EK. As previously mentioned, the sensor 15 of the calibration device 11 can sense the optical signal of the image currently displayed on the monitor device 10. The sensor 15 can convert the analog optical signal into the optical characteristic signal and transmit the optical characteristic signal to the processing chip 13 of the monitor device 10. In addition, the monitor device 10, the calibration device 11, and the computer device 12 are connected. Therefore, after the hotkey HK of the calibration device 11 is clicked, the chip processor 13 can also enable the software program 18 installed in the computer device 12 for executing an image calibration process. After the chip processor 13 receives the optical characteristic signal and requests data corresponding to a calibration mode selected by the user through the calibration interface C1, the received information can be further transmitted to the computer device 12 for advanced image processing. Here, the second memory of the computer device 12 saves a plurality of testing patterns (i.e., in the embodiment, a first testing pattern, a second testing pattern, a third testing pattern, and a fourth testing pattern corresponding to four calibration modes) for calibrating the displayed image. For example, after the chip processor 13 transmits a first data signal including the optical characteristic signal and data of the first calibration mode corresponding to the window M1 to the identification unit 17, the identification unit 17 controls the graphic processor 16 by using the software program 18 according to the first data signal. Then, the first testing pattern saved in the computer memory can be acquired. Further, the color calibration signal corresponding to the first testing pattern can be generated by the graphic processor 16 and then transmitted to the monitor device 10 for calibrating the displayed image of the monitor device 10. Similarly, after the chip processor 13 transmits a second data signal including the optical characteristic signal and data of the second calibration mode corresponding to the window M2 to the identification unit 17, the identification unit 17 controls the graphic processor 16 by using the software program 18 according to the second data signal. Then, the second testing pattern saved in the computer memory can be acquired. Further, the color calibration signal corresponding to the second testing pattern can be generated by the graphic processor 16 and then transmitted to the monitor device 10 for calibrating the displayed image of the monitor device 10. In other words, after the user triggers the image calibration process by using the hot key HK of the calibration device 11, the user can select and confirm the calibration mode to be executed by using the rolling key RK and the enter key EK of the calibration device 11. After that, the computer acquires the testing pattern corresponding to the selected calibration mode and then transmits the color calibration signal corresponding to the testing pattern to the first memory 14 of the monitor device 10. In other words, after the calibration device 11 triggers the chip processor 13 of the monitor device 10 by using the hot key HK, the chip processor 13 controls the computer device 12 to transmit some essential data (i.e., testing pattern data) to the first memory 14 of the monitor device 10 for quickly calibrating the displayed image. After the chip processor 13 of the monitor device 10 reads the testing pattern data of the first memory 14, the displayed image of the screen device 10 can be calibrated. Since the calibration interface C1 includes various calibration modes, the display system 100 can provide very high operational flexibility. Further, the monitor device 10 transmits the optical characteristic signal to the computer device 12. The computer device 12 transmits the color calibration signal or testing pattern data to the screen device 10. Thus, the monitor device 10 and the computer device 12 are capable of performing bi-directional data communications. Since the computer device 12 has high computational capability and can be used for assisting with the monitor device 10, the monitor device 10 can achieve accurate and advanced image calibration effect.

As previously mentioned, the display system 100 can include the computer device 12 for assisting with the monitor device 10 in order to achieve accurate and advanced image calibration effect. However, the display system 100 can also use its own chip processor 13 for performing the image calibration process individually. By doing so, the computer device 12 can be omitted. In other words, the display system 100 can only include the monitor device 10 and the calibration device 11. The calibration device 11 is coupled to the monitor device 10. The monitor device 10 is used for displaying the calibration interface when the image calibration process is executed. The calibration device 11 is used for selecting a calibration mode through the calibration interface. The calibration interface includes at least one calibration mode. The calibration device 11 uses at least one key for selecting and confirming a calibration mode from the at least one calibration mode. The first memory 14 of the monitor device 10 can save a plurality of testing patterns corresponding to various calibration modes. For example, the calibration interface can include a first calibration mode and a second calibration mode. The first memory 14 can save a first testing pattern corresponding to the first calibration mode (i.e., window M1) and a second testing pattern corresponding to the second calibration mode (i.e., window M2). When the user selects the first calibration mode by using the calibration device 11, the chip processor 13 of the monitor device 10 can acquire the first testing pattern saved in the first memory 14 and generate a color calibration signal corresponding to the first testing pattern for calibrating the displayed image of the monitor device 10. In practice, the color calibration signal and the first testing pattern can be pre-stored in the first memory 14 before the image calibration process is triggered. Similarly, when the user selects the second calibration mode by using the calibration device 11, the chip processor 13 of the monitor device 10 can acquire the second testing pattern saved in the first memory 14 and generate a color calibration signal corresponding to the second testing pattern for calibrating the displayed image of the monitor device 10. In other words, the display system 100 can be designed without introducing the computer device 12. The monitor device 10 can individually perform the image calibration process without any assistance of the computer device 12. Briefly, the screen device 10 is capable of receiving an optical characteristic signal generated from the sensor 15 of the calibration device 11, using an "on screen display (OSD)" function for displaying the calibration interface C1 with at least one calibration mode, and generating a color calibration signal corresponding to a testing pattern according to the optical characteristic signal and a calibration mode selected by the user. Eventually, the monitor device 10 can calibrate the displayed image by using the color calibration signal generated by itself.

To sum up, the present invention describes a display system. A monitor device of the display system is capable of calibrating a displayed image through a computer device. The monitor device of the display system can also perform self-calibration process for calibrating the displayed image instead of requiring assistance of the computer device. In addition, the calibration device of the display system is coupled to the monitor device. The calibration device has some functional keys for selecting and confirming an appropriate calibration mode by the user. Therefore, the color calibration method of the present invention can provide high operational flexibility. Moreover, since the monitor device can also perform bi-directional data communication with an external computer device, the monitor device can also achieve accurate image calibration effect by using a software program installed in the computer device. Compared with the conventional monitor device, the color calibration method of the monitor device of the display system in the present invention can provide high operation flexibility in conjunction with high reliability.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A display system for calibrating a displayed image comprising:
   a monitor device configured to display a calibration interface when an image calibration process is performed;
   a memory configured to save a first testing pattern corresponding to a first calibration mode and a second testing pattern corresponding to a second calibration mode; and
   a calibration device coupled to the monitor device and configured to select and confirm a calibration mode through the calibration interface by using at least one key;
   wherein the calibration interface comprises the first calibration mode and the second calibration mode, when the calibration device selects the first calibration mode, the monitor device uses the first testing pattern for calibrating the displayed image, and when the calibration device selects the second calibration mode, the monitor device uses the second testing pattern for calibrating the displayed image; and
   wherein the monitor device calibrates the displayed image by using a color calibration signal according to the testing pattern corresponding to the calibration mode selected through the calibration interface.

2. The display system of claim 1, wherein the calibration device comprises a mouse wheel configured to select the first calibration mode or the second calibration mode, and an enter key configured to confirm the selected calibration mode.

3. The display system of claim 1, further comprising a computer device coupled to the monitor device, wherein the computer device comprises the memory configured to save the first testing pattern and the second testing pattern.

4. The display system of claim 3, wherein the computer device further comprises an identification unit, the monitor device comprises a processor, the identification unit controls the computer device to transmit the calibration interface to the monitor device according to a third data signal generated by the processor, and the monitor device displays the calibration interface.

5. The display system of claim 3, wherein the calibration device comprises a mouse wheel configured to select the first calibration mode or the second calibration mode, and an enter key configured to confirm the selected calibration mode.

6. The display system of claim 1, wherein the calibration device comprises a hotkey and configured to trigger the image calibration process.

7. The display system of claim 1, wherein the color calibration signal includes color gamut conversion data, gamma curve table data, and RGB gain calibration data generated according to the selected calibration mode.

* * * * *